United States Patent [19]

Yokokawa et al.

[11] 3,862,065

[45] Jan. 21, 1975

[54] GRANULAR SILICONE MOLDING COMPOSITIONS

[76] Inventors: Kiyoshi Yokokawa, 787 Yanase; Jun Koizumi, 165-1 Gohara; Shigeo Mizutani, 3-11-20, Isobe, all of Annaka, Japan

[22] Filed: Aug. 9, 1973

[21] Appl. No.: 387,037

Related U.S. Application Data

[63] Continuation of Ser. No. 317,001, Dec. 20, 1972, abandoned.

[30] Foreign Application Priority Data

Dec. 23, 1971  Japan.............................. 46-10493

[52] U.S. Cl........ 260/18 S, 260/37 SB, 260/46.5 R, 260/46.5 G, 264/331
[51] Int. Cl. ............................................ C08f 19/14
[58] Field of Search......... 260/46.5 R, 46.5 G, 18 S, 260/37 SB

[56] References Cited
UNITED STATES PATENTS

| | | | |
|---|---|---|---|
| 3,160,601 | 12/1964 | Hyde............................. | 260/46.5 R |
| 3,208,961 | 9/1965 | Kookootsedes................ | 260/46.5 R |
| 3,264,260 | 8/1966 | Muller et al. .................. | 260/46.5 R |
| 3,280,071 | 10/1966 | Beck ............................ | 260/46.5 R |
| 3,627,729 | 12/1971 | Trego........................... | 260/46.5 R |
| 3,666,830 | 5/1972 | Alekna.......................... | 260/46.5 R |

*Primary Examiner*—Melvyn I. Marquis
*Attorney, Agent, or Firm*—Toren, McGeady and Stanger

[57] ABSTRACT

Granular silicone molding compositions consisting essentially of an organosiloxane resin whose melting point as measured by Durran's mercury method is 25° to 200°C, having per silicon atom an average of from 1.0 to 1.7 organic radicals directly bonded to the silicon atoms and containing at least 0.25% by weight, based on the organosiloxane resin, of hydroxyl radicals directly bonded to the silicon atoms; glass fibres having lengths ranging from 0.2 to 10 mm; powdery inorganic fillers; and a catalytic amount of a curing catalyst combination. The compositions impart excellent mechanical strength to molded articles made therefrom and are easily handled.

10 Claims, No Drawings

GRANULAR SILICONE MOLDING COMPOSITIONS

This is a continuation of application Ser. No. 317,001, filed Dec. 20, 1972, of KIYOSHI YOKOKAWA, JUN KOIZUMI and SHIGEO MIZUTANI and now abandoned.

SUMMARY OF THE INVENTION

The present invention relates to granular silicone molding compositions which are suitable for imparting excellent mechanical strengths to their molded articles.

Molding compositions whose main component is silicone have been well known. Examples of such compositions are those in granular form for molding containing silicone and various kind of inorganic fillers, as proposed by U..S. Pat. Nos. 3,208,961 and 3,264,260 and compositions for lamination containing glass fibers, glass cloths, etc., impregnated with silicone resins. Articles made from the known molding compositions have been inferior with respect to mechanical strengths, especially impact strength, while the lamination type compositions have a disadvantage in that they are unsuitable for application to molding techniques other than pressing, because they are not powdery or granular although they capable of affording excellent mechanical strength to laminated articles made therefrom.

It is an object of the present invention to provide granular silicone molding compositions which can be handled with ease and will give molded articles having excellent mechanical strength.

The granular molding compositions of the invention consist essentially of (a) 100 parts by weight of an organosiloxane resin whose melting point as measured by Durran's mercury method is from 25°to 200°C, having per silicon atom an average of from 1.0 to 1.7 organic radicals directly bonded to the silicon atoms and containing at least 0.25% by weight, based on the organosiloxane resin, of hydroxy radicals directly bonded to the silicon atoms, (b) from 50 to 200 parts by weight of glass fibres having lengths ranging from 0.2 to 10 mm, (c) from 10 to 200 parts by weight of powdery inorganic fillers, and (d) a catalytic amount of a curing catalyst combination.

It may be explained here that Durran's mercury method is a well known method for measuring the melting points of epoxy resins. In the method, 3 grams of the resin are melted in a standard test tube of 14 mm inner diameter and cooled, and 50 grams of clean mercury is placed on top of the solidified sample. The tube and contents are again heated, and the temperature at which the molten resin rises to the top of the mercury is recorded as the melting point.

The molding compositions of the present invention are suitably and effectively applicable for various kinds of molding, such as injection molding, transfer molding, and extrusion molding as well as press molding, since they have not only well balanced thermoflowing and thermosetting characteristics in a single molding process, but also, favorable characteristics with respect to weighing, conveying and handling; for example, they do not form bridges in a feed hopper of an extruder. Furthermore, such molding compositions are capable of producing articles having excellent mechanical strength, especially impact strength.

The present invention will be explained in detail below. Conventional known molding materials which consist of mixtures of silicone resins and inorganic fillers of glass fibres have been used to produce articles but provide relatively inferior mechanical strength, and especially poor impact strength. Accordingly, the conventional molding materials are suitable only for the production of small electric parts, and not for the production of large moldings. The inventors have found out that these shortcomings were due to the short length of the glass fibres in the compositions, the average length of which were 0.2 mm or less, and concluded that the glass fibres should be maintained at certain minimal lengths in the composition.

The siloxane resins used as component (a) according to the present invention should be capable of producing molding materials in the granular form and of becoming a solid when heated in the presence of curing catalysts. Such siloxane resins are selected from siloxane resins that have their melting point between 25° and 200°C, preferably 50° and 120°C as determined by Durran's mercury method, and have silicon-bonded organic radicals in an average number of from 1.0 to 1.7 per silicon atom and contain silicon-bonded hydroxyl radicals in an amount of at least 0.25% by weight. The melting point of the siloxane resins should always be in the above-mentioned range. For, when the melting point of the siloxane resins is lower than 25°C, molding compositions made therefrom would tend to conglomerate during storage and the hardness of he molded articles would be unsatisfactorily low. On the other hand, when the melting point of the siloxane resins exceeds 200°C, molding operation would become difficult, due to their poor flowability.

The units of the siloxane resins are illustratively shown as follows: $CH_3SiO_{1.5}$, $C_6H_5O_{1.5}$, $CH_2=CHSiO_{1.5}$, $CH_2=CHCH_2SiO_{1.5}$, $C_3H_7SiO_{1.5}$, $C_5H_{11}SiO_{1.5}$, $C_6H_{11}SiO_{1.5}$, $Cl_2C_6H_3SiO_{1.5}$, and $CF_3CH_2CH_2CH_2SiO_{1.5}$. In combination with any of these siloxane units, there may be included $(CH_3)_2SiO$, $(C_2H_5)_2SiO$, $(C_6H_5)_2SiO$, $CH_3(CH_2=CH)SiO$, $CH_3(C_6H_5)SiO$, $C_6H_5(CH_2=CH)SiO$, $C_6H_5(C_2H_5)SiO$, $CF_3CH_2CH_2CH_2(CH_3)SiO$ and $SiO_2$, with the provision, however that the average per silicon atom of silicon-bonded organic radicals is from 1.0 to 1.7. They may also include alkoxy radicals, such as methoxy, ethoxy, propoxy and butoxy radicals, directly bonded to the silicon atoms.

Further, component (b) should have an average length of about from 0.2 to 10 mm, in order to advantageously achieve the object and effect of the present invention. When the glass fibres are shorter than 0.2 mm, it would be impossible to obtain molded articles that have excellent mechanical strength and impact strength. On the other hand, when they are longer than 10 mm, a mixture of such fibers with the siloxane resin would be difficult to form granules of a desired size and make any molding compositions prepared therefrom less kneadable or workable in molding operations, for example, in a screw extruder. For this reason, the object of the invention can not be achieved. The suitable glass fibres of the invention may be prepared by cutting glass fibres prior to mixing with the siloxane resin to predetermined lengths. In this case, since the lengths of the glass fibre should be in the range of from 0.2 to 10 mm after they are mixed with the resin, it is preferred that the glass fibres are cut to 10 mm or longer prior to mixing, since the mixing operation usually tends to decrease the lengths of the fibres. Surface-treated glass fibres may also be used as component (b) advantageously. The surface-treated glass fibres may be prepared by treating the surfaces with various kinds of treating agents, for example, by soaking glass fibres with a glass fibre treating reagent, such as, silicone or the like, in an organic solvent and removing the solvent by drying. Since the surfaces of the glass fibres should be kept free from water, oil or other reagents during the production process, the glass fibres should preferably be dried or heat cleaned, and the affinity of the surfaces to the resin will be improved.

The powdery inorganic fillers as component (c) are employed to improve the mechanical strength of the molded articles in combination with component (b). The examples of component (c) are diatomaceous earth, clay, quartz dust, fume silica, precipitated silica, zirconium silicate, magnesium silicate and aluminum silicate. These fillers may be used together with any of calcium carbonate, magnesium oxide, titanium oxide and aluminum oxide.

The conventional silicone-curing catalysts can be used as component (d). Their examples are mixtures of at least one compound selected from the group consisting of organic acid salts of metals, such as, lead, zinc, tin and cobalt and inorganic lead compounds, such as, lead carbonate, lead sulfide and lead oxide, with at least one member selected from the group consisting of aliphatic acids, such as, acetic acid, propionic acids, butyric acids, lauric acids, palmitic acid and stearic acid; aromatic acids, such as, benzoic acids and phthalic acids, or anhydrides thereof. In the alternative, mixtures of at least one organic amine with at least one ammonium salt of the above listed aliphatic or aromatic acids.

The granular silicone molding compositions of this invention may be prepared by the usual mixing and granulating techniques that are suitable for processing the compositions. Components (a), (b), (c) and (d) are placed together on a high speed mixer equipped with an agitator to be mixed thoroughly into granular form under heating, if necessary. Or, components (a), (b), (c) and (d) are pre-mixed by a ribbon blender, then kneaded intensively on an extruder or a mixing roll into the form of rods or sheets under heating, if necessary, and thereupon those rods or sheets are applied to a pelletizer, a hammer mill or the like for crushing and granulation. Thus, the granules produced are in either round or ellipsoid, cubic or other solid shapes. For purposes of the mixing and granulation, the lengths of the glass fibres should be arranged so that they stay within the prescribed range in the molding composition produced.

The mesh size of the granular molding compositions of the invention is not critical, but should desirably be in a range suitable for the molding and granulating processes employed. For example, particle sizes in the distribution range of from 4 to 36 meshes according to the Tyler screen are appropriate. It is noted that any finer granular materials are undesirable with respect to handling, since they are apt to scatter in the air, while coarser particles cause difficulties in automatic weighing and conveying.

The components of the molding compositions of the invention should have the following proportions: 100 parts by weight of component (a), from 50 to 200 parts by weight of component (b), from 10 to 200 parts by weight of component (c) and a catalytic amount of the curing catalysts (d). Unless the proportions of these components are kept within the limits specified, it is difficult to produce granular molding compositions that can be easily handled and are capable of producing moldings having excellent mechanical strengths. Besides these components, the molding compositions of the invention may contain slight amounts of lubricants, such as, calcium stearate and aluminum stearate, pigments, such as, iron oxide and carbon black, and other stabilizers.

The following examples are illustrative only and should not be construed as limiting the invention. In the examples, the melting point of the siloxane resins are measured by Durran's mercury method, and parts or percentages are all by weight, if not otherwise indicated.

EXAMPLE 1

100 parts of a siloxane resin whose melting point is about 60°C consisting of 50 mole % monomethyl siloxy unit, 35 mole % monophenyl siloxy unit, 15 mole % diphenyl siloxy unit, and containing 0.8% of silicon-bonded hydroxyl radicals, 10 parts of fine powders of fume silica, 35 parts of fine powders of quartz, 1.0 part of zinc stearate and 2.0 parts of benzoic acid in addition to 160 parts of glass fibres (10 micron diameter) having various lengths were put into each mixer. The contents were mixed under agitation at 100°C, to produce a granular composition. Each composition thus produced was cooled, and 0.5 part of lead dioxide was mixed therewith. As a result, there were obtained molding compositions, A, B, C, D, E and F, in the form of granules or pellets, in which the average lengths of the glass fibres were about 0.1, 0.2, 0.5, 1, 3, and 6 mm, respectively.

These molding compositions were then compression-molded by a 37 ton press at 175°C and under the gauge pressure of 100 kg/cm$^2$, to produce rod-shaped articles, each having dimensions of 15 × 15 × 90 mm. These articles were put to the Charpy impact test. The results are shown in the following table.

| Molding Composition | Length of Glass Fibres* (mm) | Charpy Impact Strength (kg.cm/cm$^2$) |
| --- | --- | --- |
| A | 0.1 | 0.6 |
| B | 0.2 | 1 |
| C | 0.5 | 3 |
| D | 1 | 5 |
| E | 3 | 15 |
| F | 6 | 30 |

*Average length of glass fibres in the molding compositions.

As seen in the table above, the impact strength of the molded articles increases with the increase of the length of the glass fibre in the molding composition. Such improvements in the impact strength are remarkable when the length of the glass fibres is more than 0.2 mm. It is confirmed that if, on the other hand, the lengths of the glass fibres are greater than 10 mm, the compositions made therewith have coarser granules, resulting in very poor molding property.

EXAMPLE 2

The molding composition D of Example 1 was sifted so as to obtain materials having a size of between 4 and 36 according to the Tyler screen. These materials were applied to transfer and injection molding, individually. The results are shown below.

Transfer molding:
  Dimensions of the molded test pieces: 10 × 100 × 4 mm
  Molding conditions:
    Mold temperature           175°C
    Molding pressure           500 kg/cm$^2$
    Molding time               3 min.
  Properties of the molded test pieces:
    Barcol hardness (GYEZJ935)   25
    Bending strength            10.2 kg/mm$^2$
    External appearance of the test pieces: Good
Injection molding:
  Molded test pieces prepared according to:
    (1) ASTM D790 for measuring bending strength.
    (2) ASTM D695 for measuring compressive strength.
    (3) ASTM D256 for measuring Charpy impact strength.
  Molding conditions:
    Mold temperature           170°C
    Injection pressure         100 kg/cm$^2$
    Molding cycle              90 sec.
    Cylinder temperature       60°C
  Properties of the molded test pieces:
    Bending strength           8.6 kg/mm$^2$
    Compressive strength       10.3 kg/mm$^2$
    Charpy impact strength     6.5 kg.cm/cm$^2$

EXAMPLE 3

According to the manner of Example 1, two molding compositions, I and II, composed of the siloxane resins, glass fibres, fillers, catalysts and other additives as indicated below were prepared.

These two molding compositions were applied to the injection molding of Example 2, to produce the molded articles having the following properties.

|  | Molded article from composition | |
|---|---|---|
|  | I | II |
| Bending strength, kg/mm$^2$ | 9.0 | 11.2 |
| Compressive strength, kg/mm$^2$ | 11.5 | 12.3 |
| Charpy impact strength, kg.cm/cm$^2$ | 7.2 | 10.3 |
| Barcol hardness number | 25 | 27 |

What is claimed is:

1. A granular silicone molding composition which consists essentially of
   a. 100 parts by weight of an organosiloxane resin whose melting point as measured by Durran's mercury method is from 25° to 200°C, having per silicon atom an average of from 1.0 to 1.7 organic radicals directly bonded to the silicon atoms and containing at least 0.25% by weight of hydroxyl radicals directly bonded to the silicon atoms,
   b. from 50 to 200 parts by weight of glass fibres having lengths subsequent to being mixed in the present composition of from 0.2 to 10 mm,
   c. from 10 to 200 parts by weight of at least one powdery inorganic filler, and
   d. a catalytic amount of a curing catalyst composed of a mixture of at least one member selected from the group consisting of organic acid salts of metals, and inorganic lead compounds, and at least one member selected from the group consisting of aliphatic acids, aromatic acids, and anhydrides thereof, or a mixture of at least one organic amine and at least one ammonium salt of an organic acid

| Siloxane resin: | Molding Compositions | |
|---|---|---|
|  | I | II |
| Monomethyl siloxy unit, mole % | 20 | — |
| Monophenyl siloxy unit, mole % | 50 | 50 |
| Dimethyl siloxy unit, mole % | 30 | 50 |
| Average per silicon atom of organic radicals | 1.3 | 1.5 |
| Melting point (Durran's mercury method), °C | 60 | 70 |
| (Remark: The resin of II is one block-polymerized.) | | |
| Siloxane resin, as mentioned above, parts | 100 | 100 |
| Glass fibres (10 mm long), parts | 100 | 150 |
| Fillers: Diatomaceous earth, parts | 20 | 130 |
| Quartz dusts, parts | 100 | — |
| Fume silica, parts | — | 10 |
| Catalysts: Triethylene diamine, part | 0.5 | — |
| Benzoic acid anhydride, part | 0.5 | — |
| Lead carbonate, part | — | 0.5 |
| 2-ethyl hexylic acid, part | — | 1.0 |
| choline, part | — | 0.2 |
| Lubricants: Calcium stearate, parts | 2 | — |
| Aluminum stearate, part | — | 1.0 |
| Zinc stearate, part | — | 0.5 |
| Pigment: Iron oxide, parts | 3 | 3 | selected from the group consisting of acetic acid, propionic acid, butyric acid, lauric acid, palmitic acid, stearic acid, benzoid acid, and phthalic acid.

2. The granular silicone molding composition as claimed in claim 1 wherein said organosiloxane resin contains units selected from the group consisting of $CH_3SiO_{1.5}$, $C_6H_5SiO_{1.5}$, $CH_2=CHSiO_{1.5}$, $CH_2=CHCH_2SiO_{1.5}$, $C_3H_7SiO_{1.5}$, $C_5H_{11}SiO_{1.5}$, $C_6H_{11}SiO_{1.5}$, $Cl_2C_6H_3SiO_{1.5}$, $CF_3CH_2CH_2CH_2SiO_{1.5}$, $(CH_3)_2SiO$, $(C_2H_5)_2SiO$, $(C_6H_5)_2SiO$, $CH_3(CH_2=CH)SiO$, $CH_3(C_6H_5)SiO$, $C_6H_5(CH_2=CH)SiO$, $C_6H_5(C_2H_5)SiO$, $CF_3CH_2CH_2CH_2(CH_3)SiO$ and $SiO_2$, with the provision that the average per silicon atom of organic radicals directly bonded to the silicon atoms is from 1.0 to 1.7.

3. The granular silicone molding composition as claimed in claim 1 wherein said organosiloxane resin has a melting point of from 50° to 120°C as measured by Durran's mercury method.

4. The granular silicone molding composition as claimed in claim 1 wherein said glass fibres have lengths ranging from 0.2 to 6 mm.

5. The granular silicone molding composition as claimed in claim 1 wherein said powdery inorganic filler is at least one member selected from the group consisting of diatomaceous earth, clay, crushed quartz, fume silica, precipitated silica, zirconium silicate, magnesium silicate and aluminium silicate.

6. The granular silicone molding composition as claimed in claim 5 wherein said powdery inorganic filler is used together with at least one selected from the group consisting of calcium carbonate, magnesium oxide, titanium oxide and aluminium oxide.

7. The granular silicone molding composition of claim 1 wherein said organosiloxane resin contains alkoxy radicals selected from the group consisting of methoxy, ethoxy, propoxy and butoxy radicals.

8. The granular silicone molding composition of claim 1 wherein said curing catalyst consists essentially of an organic acid salt of a metal, selected from the group consisting of lead, zinc, tin, cobalt or an inorganic lead compound selected from the group consisting of lead carbonate, lead sulfide and lead oxide, and at least one member selected from the group consisting of acetic acid, propionic acid, butyric acid, lauric acid, palmitic acid, stearic acid, benzoic acid, phthalic acid, and anhydrides thereof.

9. A granular silicone molding composition which consists essentially of
   a. 100 parts by weight of an organosiloxane resin whose melting point as measured by Durran's mercury method is from 50° to 120°C, having per silicon atom an average of from 1.0 to 1.7 organic radicals directly bonded to the silicon atoms and containing at least 0.25% by weight of hydroxyl radicals directly bonded to the silicon atoms,
   b. from 50 to 200 parts by weight of glass fibres having lengths subsequent to being mixed in the present composition of from 0.2 to 10 mm,
   c. from 10 to 200 parts by weight of at least one powdery inorganic filler, and
   d. a catalytic amount of a curing catalyst composed of a mixture of at least one member selected from the group consisting of organic salts of metals, and inorganic lead compounds, and at least one member selected from the group consisting of aliphatic acids, aromatic acids, and anhydrides thereof, or a mixture of at least one organic amine and at least one ammonium salt of an organic acid selected from the group consisting of acetic acid, propionic acid, butyric acid, lauric acid, palmitic acid, stearic acid, benzoic acid, and phthalic acid.

10. The granular silicone molding composition as claimed in claim 9 which has a particle size ranging from 4 to 36 mesh of the Tyler screen.

* * * * *

UNITED STATES PATENT OFFICE
CERTIFICATE OF CORRECTION

Patent No. 3862 065      Dated January 21, 1975

Inventor(s) Kiyoshi Yokokawa et al

It is certified that error appears in the above-identified patent and that said Letters Patent are hereby corrected as shown below:

In the heading of the patent, the name and country of the assignee should read:

--[73] Assignee:   Shinetsu Chemical Company
                     of Tokyo, JAPAN Signed and sealed this 22nd day of April 1975.

(SEAL)
Attest:

RUTH C. MASON
Attesting Officer

C. MARSHALL DANN
Commissioner of Patents
and Trademarks